UNITED STATES PATENT OFFICE.

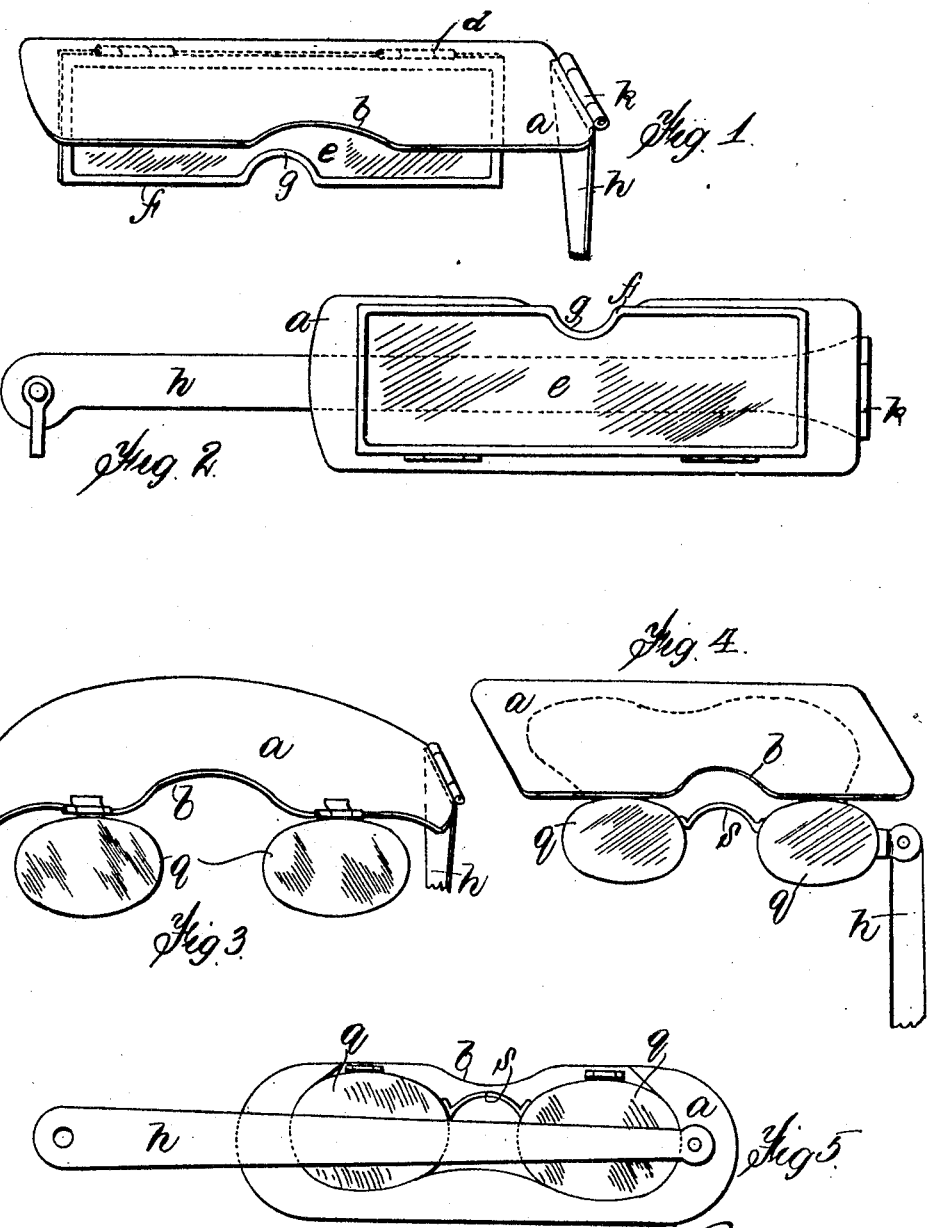

GEORGINA HEDDON, OF LONDON, ENGLAND.

OPTICAL APPARATUS.

No. 856,778.

Specification of Letters Patent.

Patented June 11, 1907.

Application filed August 4, 1906. Serial No. 329,252.

*To all whom it may concern:*

Be it known that I, GEORGINA HEDDON, a subject of the King of England, and residing at 10 Brunswick Square, in the county of London, England, have invented new and useful Improvements in Optical Apparatus, of which the following is a specification.

My invention relates to a new and improved optical apparatus having for its object a means of providing an appliance, preferably of an ornamental character, for personal comfort, in which lorgnettes, eye-glasses, spectacles, colored glasses or other media used in the ordinary way for assisting vision or for protecting the eyes from the glare of the sun or artificial light can be combined with or form part of an eye-shade provided with a handle or its equivalent for the purpose of holding it, in the hand, or attaching same to any part of the person.

Any of the well-known means for assisting vision such as lenses of various kinds, tinted glass, celluloid or other transparent or semi-transparent media may be thus used for the purpose of protecting the eyes of tourists, drivers, motorists and others from excessive light, wind, dust or other hurtful influences.

In one form of my invention, I make a frame of metal, celluloid, tortoise-shell, wood, or any other suitable material of such shape as to be easily placed immediately in front of the eyes. In the frame I place tinted or colored glass, celluloid, or the like transparent or semi-transparent material. Hinged upon the upper part of the said frame I place a shade of the same or like material, which shade when in use normally assumes a position about at right angles to the frame. Conveniently fixed either to the frame or shade I make a handle which, when in use, can be held by the hand or by other convenient means but when out of use is folded upon either the frame or shade.

In another form of my invention I may make eye-glasses either joined by a nose bridge piece or without such bridge piece attached by hinges to the shade which may then assume a shape somewhat resembling that of the hand, while shading the eyes, that is concave on the under surface. When in use the eye-glasses come into a position at or about at right angles to the under side of the shade, which can be held as before described by means of a straight telescoping or folding handle. In some cases the eye-glasses, frame or other attachments may fit or fold into recesses in the shade. In other cases the handle may be dispensed with and the shade and protector or glasses be fitted to a cap or other covering for the head in which form the combined device is especially useful for motorists, drivers and others. And in order that my said invention may be better understood, I will proceed to describe the same with reference to the drawing accompanying this specification, in which:—

Figure 1 shows an elevation of the optical appliance in which glass tinted or otherwise may be fitted into the vertical frame. Fig. 2 shows plan of same folded; Fig. 3 shows the optical appliance fitted separately with eye-glasses hinged thereto; Fig. 4 shows the optical appliance with ordinary spectacles or glasses connected by a nose bridge piece; Fig. 5 shows plan of an optical appliance such as that represented at Fig. 4, folded up.

The same letters of reference are employed to denote the same parts in all the views:—

$a$ is the shade portion of the optical appliance. This shade may be of wood, celluloid, metal, ivory, tortoise-shell or any other suitable material and is shaped at $b$ as shown to conform to the forehead and fit closely over the eyes.

In the form shown at Fig. 1 a flap provided with a piece of smoked or colored glass or other transparent or semi-transparent material $e$ carried in a frame $f$ is hinged to the shade $a$ at $d$. This flap is provided with a cut-away portion $g$ to fit over the nose. $h$ is the handle hinged at $k$ to the shade $a$. This hinge $k$ is so constructed that the handle $h$ may be folded over and rest flat upon the shade $a$. This handle may be in one piece as shown at Fig. 1 or if desired it may be made to telescope or fold.

Referring to Fig. 3 it will be seen that in place of the flap, glasses $q$ which may be lenses or ordinary smoked or other glasses are provided which may fold down against the shade $a$ when not in use. In this case a shade is shown shaped somewhat like the hand when shading the eyes and the glasses fold down into the concave portion.

In Fig. 4 an optical appliance is shown composed of spectacles or glasses $q$ provided with a nose bridge piece $s$. In this cases the glasses may be adapted to fold into a recess in the flap $a$ as shown dotted. This form of the appliance is shown folded up in Fig. 5.

Where desired the handle may be made to telescope instead of being in one piece or folding and a spring may be provided which causes the shade, glasses and protector to open and assume their relative and proper positions when a catch is released.

It will be obvious that the appliance may be fitted to a motor cap or other headgear when desired and in some cases the handle may then be dispensed with and the entire appliance may be attached to the front of the cap and if desired fold into a recess therein when not required for use.

What I do claim and desire to secure by Letters Patent of the United States of America, is:—

1. The combination of a shade having a cut-away portion, a pair of eye glasses hinged to said shade and adapted to fit into said cut-away portion, and a folding handle, substantially as described.

2. The combination of a pair of eye glasses, a folding handle, and a shade hinged to said eye glasses, said shade being cut away to fit around the nose of the user and having a recessed portion into which said eye glasses may fold, substantially as described.

3. The combination of a shade having a cut-away portion, a pair of eye glasses hinged to said shade and adapted to fit into said cut-away portion, and a handle pivoted to said eye glasses, substantially as described.

4. The combination of a pair of eye glasses, a handle pivotally attached thereto, and a shade hinged to said eye glasses, said shade being cut away to fit around the nose of the user and having a recessed portion into which said eye glasses may fold, substantially as described.

In testimony whereof, I affix my signature, in presence of two witnesses.

GEORGINA HEDDON.

Witnesses:
R. WESTACOTT,
A. NUTTING.